Oct. 5, 1926. 1,602,014
W. C. GRAHAM ET AL
PROCESS AND APPARATUS FOR SEPARATING SUBSTANCES FROM LIQUIDS
Filed Jan. 5, 1925 3 Sheets-Sheet 2

Inventors:
Walton C. Graham
Horace S. Rumsey
Ashur U. Wetherbee
By George Brguere Jones Atty.

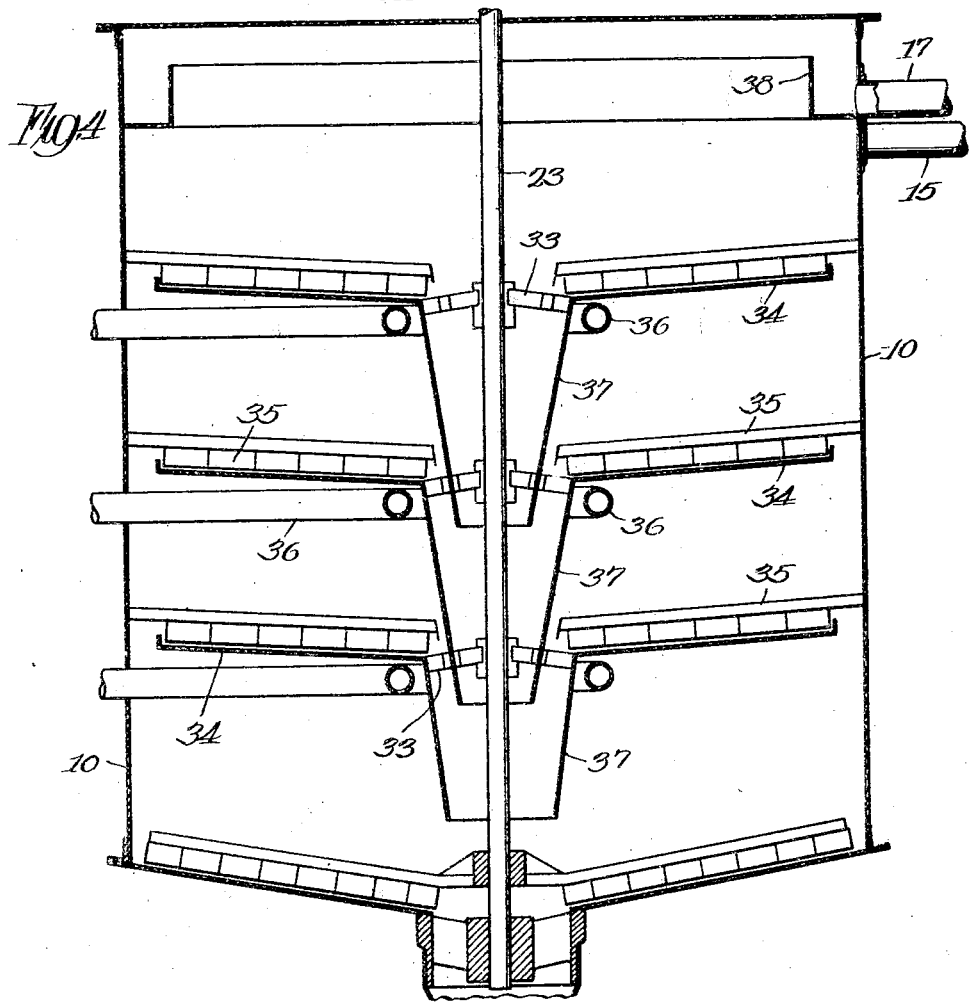
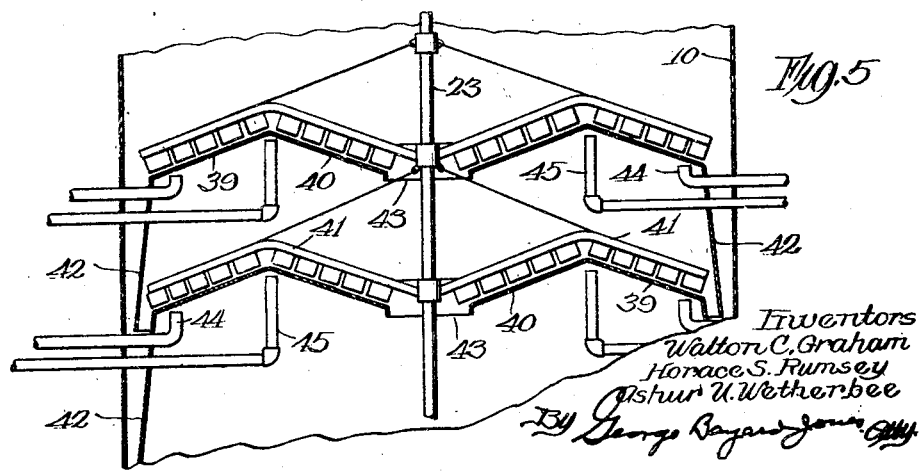

Patented Oct. 5, 1926.

1,602,014

UNITED STATES PATENT OFFICE.

WALTON C. GRAHAM, OF DENVER, COLORADO; HORACE S. RUMSEY, OF ST. LOUIS, MISSOURI; AND ASHUR U. WETHERBEE, OF EVANSTON, ILLINOIS, ASSIGNORS TO GILCHRIST & COMPANY, A CORPORATION OF DELAWARE.

PROCESS AND APPARATUS FOR SEPARATING SUBSTANCES FROM LIQUIDS.

Application filed January 5, 1925. Serial No. 496.

This invention relates to an improved process and apparatus for separating substances, such as solids and gases, from liquids.

The object of the invention is to provide for a more complete separation of finely divided substances from the liquid, than has been possible heretofore, in apparatus of this general character.

In typical prior apparatus, the material to be separated enters the settling chamber through an upper central opening, the suspended particles settling to the bottom and the clearer liquid moving slowly outwardly, more or less radially, to suitable outlets. Mechanical sweeps or scrapers are arranged to push the deposited matter in toward a lower central opening. The movement of the deposited material and of the clear liquid is therefore in opposite directions, resulting in stirring up the liquid to some extent and causing some of the finer particles, at least, to be restored into suspension.

An object of the present invention is to overcome these difficulties by means of an improved process and apparatus providing a parallel flow of deposited matter and of the clear liquid, whereby remixing of said solids and liquid is reduced to a minimum.

An additional object is to provide a process and apparatus whereby operation through multiple stages of settling and drawing off the clear liquid will increase the clarity of the final liquid, each stage maintaining equal efficacy, whereas with prior apparatus such successive operations decrease the effectiveness of the separation.

A further object is to provide equipment of this character having increased efficiency and capacity.

In the accompanying drawings, I have illustrated several embodiments of the invention.

Fig. 4 is a sectional elevation of a further modified apparatus, and

Fig. 5 is a similar view of an additional modification, shown somewhat diagrammatically.

Figure 1:
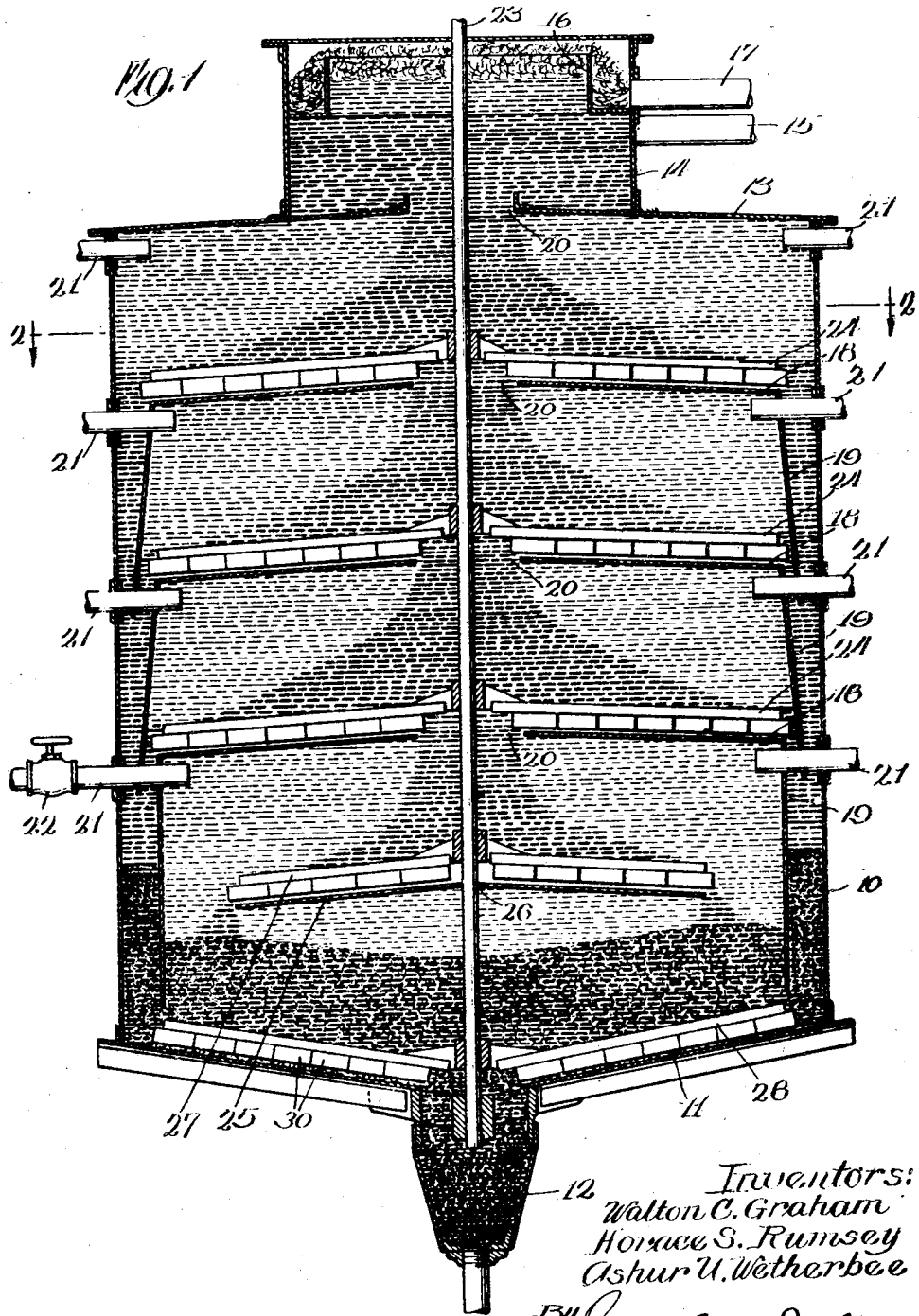
Fig. 1 is a sectional elevation of one form of equipment.

The equipment comprises a suitable tank having an outer wall 10 which is preferably of cylindrical form having a bottom 11 which may be inclined to form a conical discharge with an outlet 12. The tank is closed by a top wall 13 having an auxiliary receptacle 14 (or a separate tank) constituting a reservoir for the fluid containing gas, air, or other substances, such as solid particles in a finely divided state, which are to be separated. A suitable liquor head is maintained in this tank by means of a supply pipe 15 communicating with the reservoir 14. An overflow member 16 is provided, whereby the scum may overflow the top thereof and be drawn off through the discharge pipe 17.

The tank is divided preferably into a plurality of vertically superimposed chambers by one or more transverse partitions 18 which are preferably in the form of substantially horizontal disks separated from the outer wall 10, so as to leave a clearance space down which the accumulated solid matter flows. Although the drawings show equipment having a plurality of settling chambers and a common lower chamber for the accumulated sediment, a single settling chamber, together with a lower sediment chamber is contemplated.

At the peripheries of the circular shelves or partitions 18 is a depending apron or flange 19 which is preferably slightly flared. With this arrangement each of the superimposed chambers is closed or shut off from the main body of the liquid except at the central inlet opening 20 and at the circumferential discharge clearance space near the bottom of the flanges 19. Suitable outlet pipes 21 are provided which communicate with the upper portion of each of the superimposed chambers and pass through the clearance space and the outer wall of the tank. Said pipes are provided with suitable valves 22, or other means of regulation.

Figure 2:
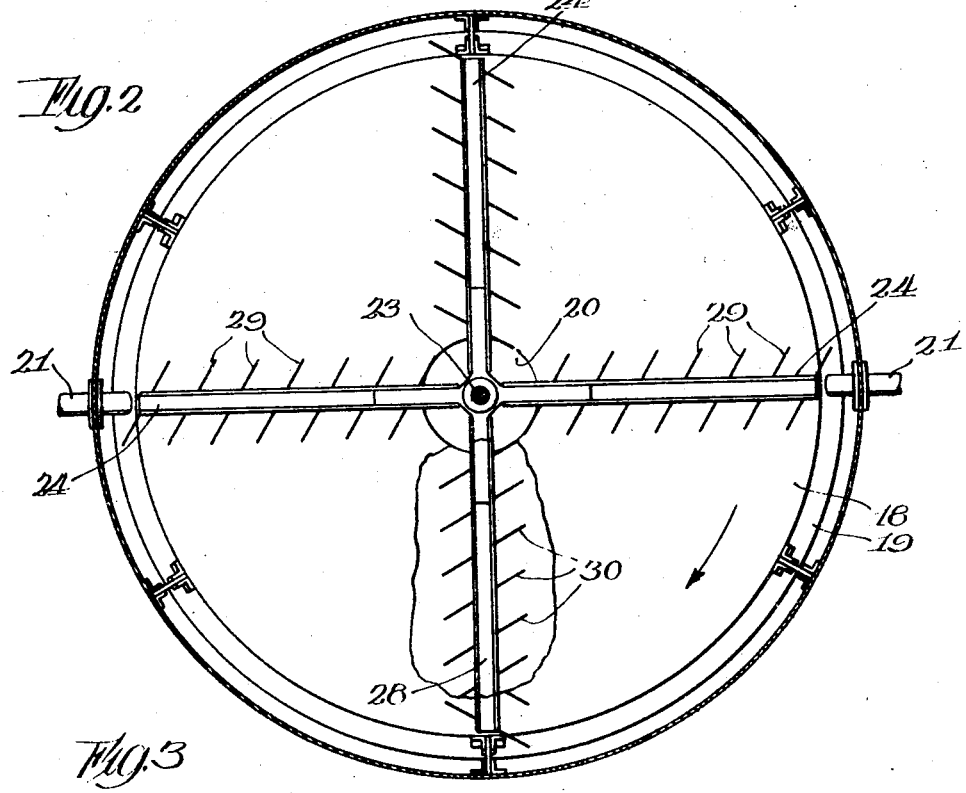
Fig. 2 is a section on line 2—2, Fig. 1.

A rotatable shaft 23 passes through the tank and through the several openings 20 in the horizontal partitions, and has mounted on it a series of sweeps 24. When the shaft is rotated by suitable means (not shown) the rotation of the sweeps advances the sediment in each chamber towards the periphery thereof, causing it to fall downwardly through the annular clearance space between the outer wall 10 and the flanges 19. The lower chamber may be divided into an upper and a lower compartment by a transverse partition 25 having a small central opening 26 large enough for the shaft only, but not large enough for any appreciable flow of liquid. Another sweep 27, preferably somewhat smaller than those previously described, is mounted on the shaft 23 above said partition. An additional sweep 28 is mounted on said shaft at the bottom of the tank. As shown in Fig. 2, the sweeps are provided with means for advancing the sediment towards the discharge openings in each case. Such means may have the form shown in Fig. 2, consisting of blades of thin material 29 mounted at an angle with reference to the radial supporting arms, whereby rotation of the sweeps in the direction of the arrow will result in advancing the sediment to the periphery of the several transverse partitions. The blades 30 on the lowermost sweep at the bottom of the tank are arranged in the reverse direction in order to aid the sediment in discharging into the central outlet 12.

Figure 3:
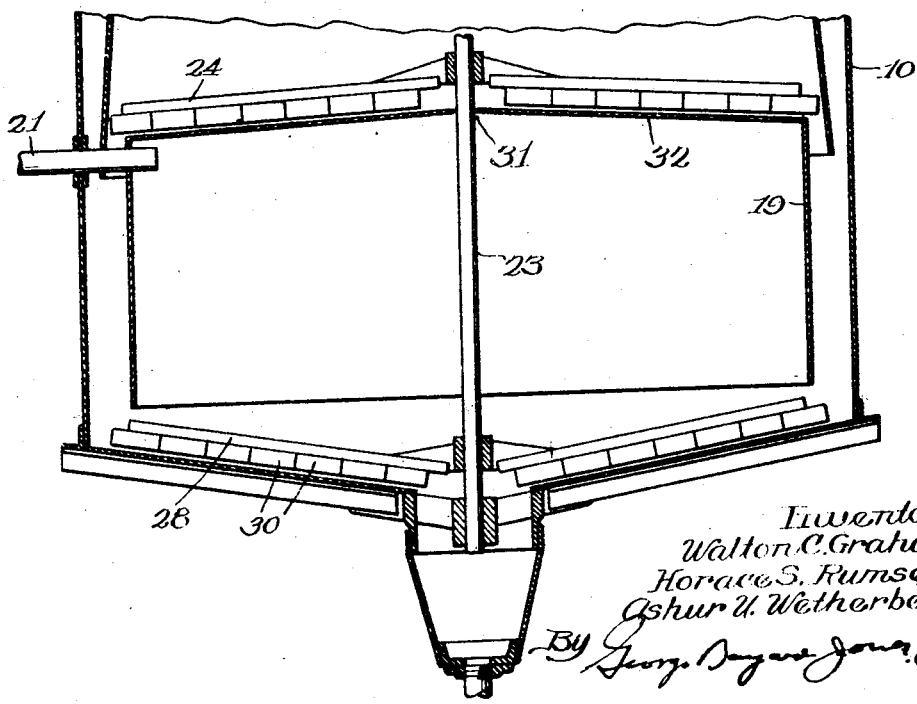
Fig. 3 is a sectional elevation of the lower part of modified apparatus.

In the form of apparatus shown in Fig. 3, the construction is the same as the apparatus shown in Fig. 1, and the same corresponding reference characters have been applied. The transverse partition and sweep have been omitted from the lower chamber, however, and the central opening 31 in the upper roof 32 of the lower chamber has been reduced to a minimum to accommodate the shaft without permitting the flow of liquid therethrough.

In the description of the operation which follows, the term "fluid" is applied to the material being treated and varies in different arts. The liquid is what is drawn off as a result of the operation, or is clarified. The sediment is that which settles to the bottom of the apparatus and the scum is the floating foreign material, including gas (air) which may be a part of the scum, or the gas may escape separately from the scum.

A suitable head of fluid is maintained in the tank and the sediment slowly settles to the bottom in each chamber, whereupon the slowly rotating sweeps push the deposited material towards the peripheries of the chambers causing said material to flow downwardly to the bottom compartment and to the outlet 12. The gases and floating material pass upwardly and are discharged through the auxiliary receptacle 14.

The clearer liquid in each chamber will be found near the upper and outer peripheries thereof, as indicated in the drawings, and passes out through the various discharge pipes 21, which may be extended, if desired, to provide a plurality of radial outlets in each chamber. The downwardly extending flanges 19 provide an annular discharge chamber separate and distinct from the settling chambers, and thus prevent mingling of the sediment with the clear liquid as the sediment is flowing downwardly from the several compartments.

It will be seen that the original fluid, which is turbid, is introduced at the center of the compartment and flows slowly and at a continually decreasing rate, more or less radially outward, as the solids are settling to the bottom of the compartment, the gases and floating material rising to the highest point of the chamber, which, in this case, is the central opening. However, as the solids are deposited they are continually being removed mechanically in the same direction as the liquid is flowing;—that is outwardly, and the gases and floating material are continuously passing out at the top. For this reason, there is less tendency to agitate the deposited material and cloud the liquid than in the prior practice in which there is a counter-flow of deposited material with reference to the clear liquid.

Since the particles, which are the last to settle and therefore the easiest to be restored to suspension, are deposited at the points farthest removed from the inlet, at which point the velocity of flow of the clearer liquid is a minimum, they are the first to be discharged over the edge into a special receiving compartment at the bottom, which is common to all of the separating chambers. In this manner fines once separated are not re-suspended to any appreciable extent while moving to the bottom of the receiving compartment.

In the prior art practice, the sediment which is removed from a compartment is discharged at the center of the same into the fresh turbid liquid entering the next lower compartment. At this point of entrance, the turbid liquid has the greatest velocity, and a portion of the sediment once settled in and discharged from the upper compartment is again suspended and must be resettled in the lower compartment. This process of settling, re-suspension and re-settling must be repeated as many times as there are compartments.

A further advantage of this preferred form of apparatus described, is that the solids are received in a separate common compartment near the bottom of the tank in which minimum liquid velocity exists and from which the solids are removed by suitable mechanical means, thus tending to avoid agitating or re-suspension of the fines.

In Fig. 1 of the drawings, the auxiliary partition 25 is provided to further separate the deposited solid matter from the clearer liquid above it, thereby minimizing possible agitation and re-suspension. The deposited material or mud may collect in the annular space to a considerable height, as indicated in the drawings, the weight of this material forcing some of the sediment into the lowermost chamber, but at a lower level. This accumulation serves to practically seal the bottom of the lowermost compartment where the apron 19 terminates.

In Fig. 3, the auxiliary partition and auxiliary sweep in the lower chamber are omitted, but the opening in the roof of the compartment is made small, or omitted, preferably just large enough to accommodate the shaft 23, thereby avoiding stirring up of the deposited material by the introduction of a stream of liquid through the central opening. Such liquid as is present in said lower compartment is drawn off in the same manner as in the upper compartments.

The roof of each compartment is preferably crowned slightly, whereby any entrapped scums may escape through the central openings. This incline also facilitates to a slight extent the removal of the deposits by the sweeps.

The advantages of the present equipment may be summarized as follows:—The lighter particles of sediment are moved the shortest distance. In prior equipment the lighter sediment is moved the greatest distance and all of the sediment moved inwardly toward the center is in opposition to the outward flow of fluid, thus restoring some of the fine material to re-suspension. The sediment is discharged at the point of minimum velocity of the fluid. In prior systems, the sediment is discharged at the point of maximum velocity, and is discharged into the adjoining chamber with the entering fluid instead of through a separate outlet. In prior systems, the sediment falls in the form of what may be called a "screen" into the lower compartment and the fluid entering the lower compartment centrally thereof is compelled to pass out through this falling screen, thereby picking up much of the sediment, necessitating that it be re-deposited. This operation is repeated as often as there are compartments. In view of this action, the number of compartments which may be used is quite limited, whereas in the present apparatus a large number of compartments may be used as there is no diminution of capacity in the lower compartments, each compartment operating with equal efficiency.

In some industries it is desired to save the solids as the valuable material, and any cloudiness of the effluent represents loss of efficiency, whereas in other industries it is desired to save the clear liquid in which case the cloudiness represents undesired impurities. In either case, the advantage of this apparatus, in providing for increased clarity and efficiency, is apparent.

In the two forms of apparatus described, the parallel flow method of separation is carried out by a substantially radial flow of the liquid from the center toward the periphery of the chambers. However, many of the advantages of said parallel flow may be obtained with a movement of the liquid in the reverse direction;—that is radially inward from the periphery toward the center with a corresponding movement of the sediment in the same direction, the scums escaping at or near the peripheral inlets. Such a construction is illustrated in Fig. 4 in which there is also shown a reversal of the relative movement of the sweeps and the shelves from which the sediment is being removed.

In Fig. 4, the rotatable shaft 23 carries a plurality of brackets or spiders 33 on which are mounted the partitions or shelves 34. Said shelves are preferably inclined toward the discharge outlet, and for this purpose are slightly dished instead of being slightly crowned. In other words, each slopes inwardly toward a central discharge opening instead of outwardly toward a peripheral discharge opening. By virtue of this mounting, the shelves rotate instead of being stationary, and the sweeps 35 instead of being mounted on the shaft are stationary, being mounted in any suitable way, as, for example, by securing them to the side wall 10 of the tank. Said shelves terminate short of said wall 10, thereby providing a circumferential clearance space, which in this case constitutes an inlet for the liquid instead of a discharge outlet for the sediment.

A suitable outlet is provided near the inner and upper part of each chamber. The pipe 36 may be used as such outlet, providing a plurality of circumferential openings for drawing off the clear liquid, which is conducted to the outside of the tank. A wall 37, which may have the form of a conical discharge outlet is also secured to the spiders 33, thereby providing a separate passageway for the sediment, completely shutting it off from the clear liquid in the adjacent chamber.

The fluid enters through the inlet 15, as in the previously described construction, the scums rising and flowing over the top of the wall 38, said wall forming a ring of large diameter, and the scum being drawn off through the outlet 17. The liquid flows slowly downwardly through the outer circumferential clearance spaces between the periphery of the trays and the outer wall of the tank, and the sediment is slowly pushed inwardly as the trays rotate, said sediment passing downwardly through the central discharge funnels and accumulating in the lowermost compartment near the center thereof. In this apparatus, it will be noted that the flow of liquid in the several chambers is more or less radially inward, the clear liquid being drawn off through outlets located near the center of each chamber, and the sediment being discharged also near the center of each chamber, but at the bottom thereof. Furthermore, the particles which settle last are moved the shortest distance, as in the prior construction.

While in the equipment just described there is a reversal of the direction of flow of the liquid, and also a relative reversal of the arrangement of rotatable and fixed trays and sweeps, it is apparent that either of these operations may be reversed without necessarily reversing both. For example, the inward parallel radial flow may be adopted with fixed trays and rotatable sweeps, while an outward parallel flow may be used with rotatable trays and fixed sweeps. It is also apparent that both the trays and the sweeps may be rotated at different rates, although the described constructions are simpler.

Fig. 5 describes a further modified apparatus in which the flow of fluid and sediment is parallel only to a limited extent, and therefore the advantages of the previously described apparatus are obtained in a lessened degree. In this apparatus the trays have a double slope, the outer part 39 sloping downwardly and outwardly, and the inner part 40 sloping downwardly toward the center. The sweeps 41 are correspondingly shaped, and, hence, the sediment is moved in opposite directions from the crown of the trays, discharging both outwardly and inwardly. The sediment discharging outwardly passes through the annular clearance space between the aprons 42 and the outer wall 10 of the tank, the rest of the sediment passing downwardly through the central discharge opening 43. The clear liquid is drawn off through suitable outlets, illustrated by the pipes 44, and the scum is drawn off through additional pipes 45, the scum outlet being located at substantially the highest point in each chamber. A plurality of such liquid and scum outlets may be provided in each chamber, if desired. In connection with this figure, the relative rotation of the trays and the sweeps may be reversed, as in the previously described figure.

Under certain conditions, the sweeps may be dispensed with, if the slope of the partitions is steep enough. It will be obvious that the invention may be embodied in various other forms, the apparatus shown herein being selected primarily for purposes of illustration.

What we claim is:—

1. The herein described process of clarifying fluid which consists in introducing the fluid centrally into a chamber, drawing off fluid at points radially remote from the inlet, thereby causing a slow radial movement of said fluid, whereby the sediment settles and the scums rise and are removed through the central inlet, the sediment being removed in a radial direction without opposing the direction of flow of said liquid.

2. The herein described process which consists in introducing into a chamber through the upper central part thereof a fluid carrying solids in suspension and causing said fluid to flow radially outward toward discharge openings remote from the point of inflow, whereby the outward flow is at a continually decreasing rate, resulting in settling of the sediment with the heavier particles near the center and the lighter particles near the outer portions of the chamber, and removing said sediment from the bottom of said chamber through an outlet remote from the center, whereby re-suspension of the sediment is reduced to a minimum.

3. The herein described process of separating liquid and other substances which consists in introducing the fluid into a plurality of adjacent chambers, simultaneously removing the substances from the fluid by permitting separation of said substances by gravity, discharging the accumulated heavier substances outwardly into a common discharge chamber, and the lighter substances inwardly and upwardly, and removing the clear liquid from the several chambers.

4. Apparatus for separating substances in suspension from fluids, comprising an outer wall providing a chamber having an upper central inlet for the fluid, an outlet near the periphery of said chamber, whereby the fluid flows radially from the inlet to the outlet at a decreasing rate, permitting the substances to separate at the bottom and top of said chamber, and means for causing the discharge of sediment from said chamber near the outer confines thereof, the scums rising and passing out through said central opening.

5. Apparatus for separating substances in suspension from fluids comprising an outer wall providing a chamber, a transverse wall in said chamber dividing the same into a plurality of superimposed compartments, one of which has an upper central inlet and means for causing the discharge of sediment from one of said compartments, near the outer confines thereof.

6. Apparatus for separating substances, etc., in suspension from fluids, comprising a cylindrical outer wall, substantially horizontal transverse partitions therein terminating short of said outer wall to provide a clearance space, and rotating means for advancing the sediment which accumulates on each of said horizontal walls toward the outer periphery thereof.

7. Apparatus for separating substances in suspension from fluids comprising a cylindrical tank, a series of substantially horizontal partitions therein having central openings, said partitions terminating short of the wall of the tank and having a downwardly extending flange providing a clearance space between the two.

8. Apparatus for separating substances in suspension from fluids, comprising a tank, a series of substantially horizontal partitions therein having central openings, said partitions terminating short of the wall of the tank and having a downwardly extending flange providing a clearance space between the two, and mechanical means for sweeping the sediment which collects on said horizontal walls toward said annular space whereby it discharges therethrough.

9. Apparatus for separating substances in suspension from fluids, comprising a tank, a series of substantially horizontal partitions therein having central openings, said partitions terminating short of the wall of the tank and having a downwardly extending flange providing a clearance space between the two, mechanical means for sweeping the sediment which collects on said horizontal walls toward said annular space, whereby it discharges therethrough, and means permitting the discharge of the clear liquid from a point adjacent the juncture of said walls and said depending flanges.

10. Apparatus of the class described, comprising a cylindrical tank having an outlet at the lowest point, a rotatable shaft arranged vertically in said tank, a plurality of superimposed sweeps mounted thereon, and substantially horizontal disk shaped partitions arranged each below one of said sweeps, a downwardly extending flange at the periphery of each of said disks, said flanges being spaced from the outer wall of the tank to provide an annular clearance space, outlet pipes passing through said flanges and outer wall, and a clearance between the bottom of each flange and the disk beneath it, whereby solid matter may be discharged outwardly over each of said disks and downwardly through said annular space onto the bottom of the tank, and thence be removed.

11. Apparatus of the character described for separating substances in suspension from fluid, comprising a tank, a plurality of substantially horizontal crowned partitions therein forming a plurality of superimposed chambers, an additional partition in the lowermost chamber of a less diameter than the diameter of said chambers, and sweeps arranged one above each of said partitions.

12. Apparatus of the character described for separating substances in suspension from fluids comprising a tank, a plurality of substantially horizontal crowned partitions therein, each partition having a depending apron at its periphery, said aprons being separated from the wall of said tank to provide an annular clearance space, outlets for the discharge of liquid near the juncture of said partitions and said aprons, there being central openings in said partitions to permit escape of scums from beneath said partitions.

13. Apparatus of the character described for separating substances in suspension from fluids, comprising an outer wall providing a chamber, a transverse wall in said chamber dividing the same into a plurality of superimposed compartments, an inlet for said fluid, an outlet for the clear liquid, a separate outlet for the sediment, and means for moving said sediment towards its outlet the movement of said liquid and said sediment being substantially radial and in the same direction to avoid re-suspension.

14. Apparatus of the character described for separating substances in suspension from fluids, comprising an outer wall providing a chamber, a transverse wall in said chamber dividing the same into a plurality of superimposed compartments, an inlet for said fluid, an outlet for the clear liquid, a separate outlet for the sediment, and means for moving said sediment towards its outlet, the movement of said liquid and said sediment being substantially radial and in the same direction to avoid re-suspension, said means comprising rotatable sweeps.

15. Apparatus of the character described for separating substances in suspension from fluids, comprising a cylindrical outer wall, substantially horizontal transverse partitions therein having central openings and terminating short of said outer wall to provide an annular opening, said fluid flowing from one of said openings toward the other, and diagonally arranged blades for moving the sediment which accumulates on each of said horizontal partitions in the same direction as said fluid.

In testimony whereof, we have subscribed our names.

WALTON C. GRAHAM.
HORACE S. RUMSEY.
ASHUR U. WETHERBEE.